(12) United States Patent
Chapman et al.

(10) Patent No.: US 12,423,217 B2
(45) Date of Patent: Sep. 23, 2025

(54) TEST CODES FOR SECURE TEST MODE ON MATH ASSISTANCE DEVICES

(71) Applicant: Texas Instruments Incorporated, Dallas, TX (US)

(72) Inventors: Trevor Thomas Chapman, Allen, TX (US); Stephen B Loe, Dallas, TX (US); Malgorzata Anna Brothers, Plano, TX (US); Matt Thomas Nicolosi, Delaware, OH (US); Michel Georges Stella, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1063 days.

(21) Appl. No.: 17/458,544

(22) Filed: Aug. 27, 2021

(65) Prior Publication Data
US 2022/0164307 A1    May 26, 2022

Related U.S. Application Data

(60) Provisional application No. 63/116,310, filed on Nov. 20, 2020.

(51) Int. Cl.
*G06F 11/3668* (2025.01)
*G06F 21/74* (2013.01)

(52) U.S. Cl.
CPC ........ *G06F 11/368* (2013.01); *G06F 11/3684* (2013.01); *G06F 21/74* (2013.01)

(58) Field of Classification Search
CPC ..... G06F 11/368; G06F 11/3684; G06F 21/74
See application file for complete search history.

(56) References Cited

U.S. PATENT DOCUMENTS

| 10,248,550 | B2 * | 4/2019 | Kadioglu | G06F 11/368 |
| 2005/0060622 | A1 * | 3/2005 | Clark | G01R 31/31926 714/724 |
| 2015/0310932 | A1 * | 10/2015 | Nappi | G11C 29/16 714/718 |

OTHER PUBLICATIONS

"TI-Nspire Press-to-Test Guidebook", Texas Instruments Incorporated, 2021, pp. 1-28.
"Exam Mode Guide", Casio, 2021 pp. 1-4.
"TI-Nspire CX Premium Teacher Software Guidebook", Texas Instruments Incorporated, 2021, pp. 1-606.
"TI-Nspire CX Student Software Guidebook", Texas Instruments Incorporated, 2021, pp. 1-525.

* cited by examiner

*Primary Examiner* — Joseph D Torres
(74) *Attorney, Agent, or Firm* — Charles F. Koch; Frank D. Cimino

(57) ABSTRACT

A method for test configuration on a first math assistance device is provided that includes receiving a test code by the first math assistance device, wherein the test code includes one or more functionality restrictions, and entering secure test mode on the first math assistance device with the one or more functionality restrictions.

27 Claims, 15 Drawing Sheets

Figure 1A:
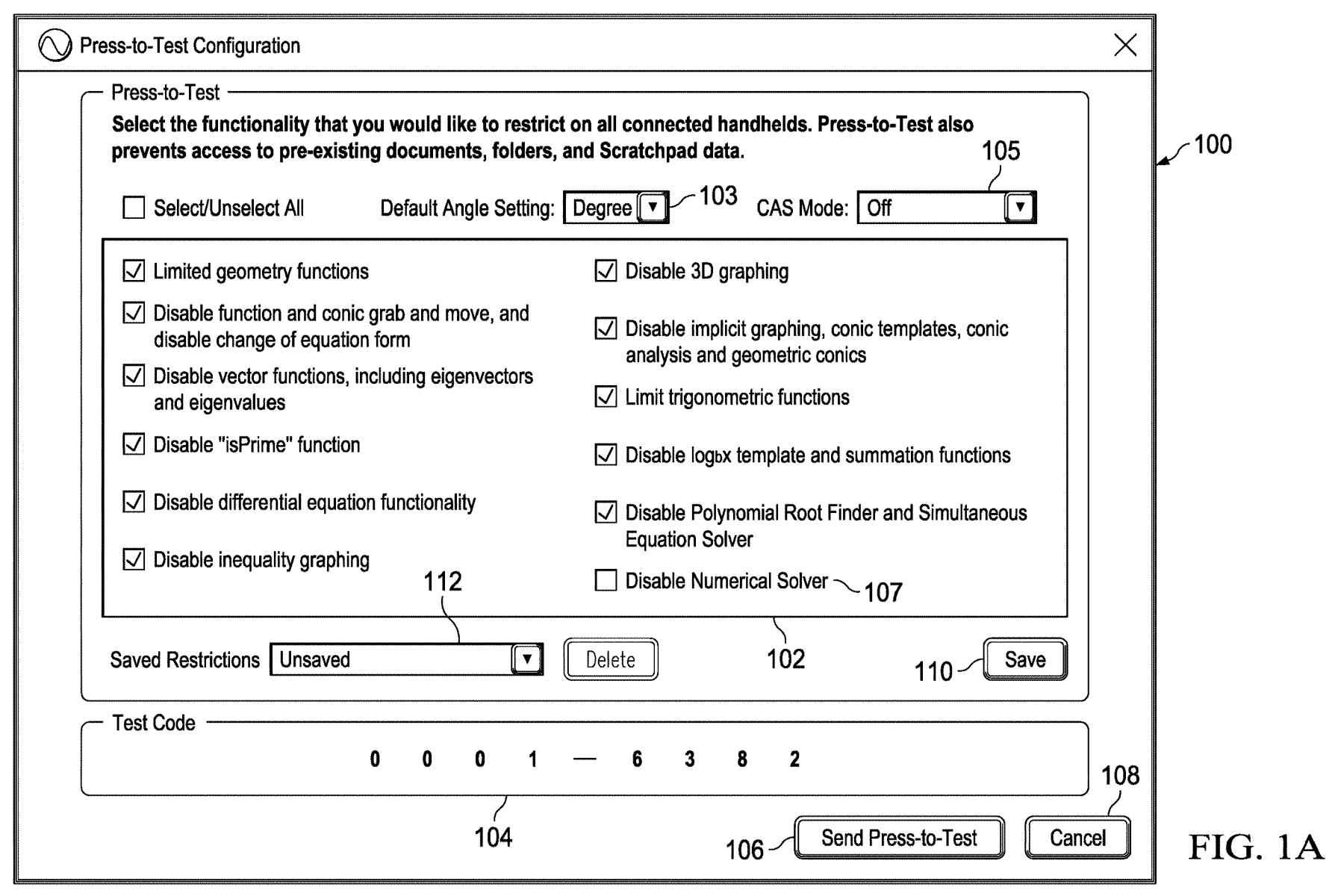

Press-to-Test Configuration

Select the functionality that you would like to restrict on all connected handhelds. Press-to-Test also prevents access to pre-existing documents, folders, and Scratchpad data.

Default Angle Setting: Degree ▼ — 103    CAS Mode: Off ▼ — 105

☐ Select/Unselect All

☑ Limited geometry functions
☑ Disable function and conic grab and move, and disable change of equation form
☑ Disable vector functions, including eigenvectors and eigenvalues
☑ Disable "isPrime" function
☑ Disable differential equation functionality
☑ Disable inequality graphing ☑ Disable 3D graphing
☑ Disable implicit graphing, conic templates, conic analysis and geometric conics
☑ Limit trigonometric functions
☑ Disable logbx template and summation functions
☑ Disable Polynomial Root Finder and Simultaneous Equation Solver
☐ Disable Numerical Solver — 107

— 102

Saved Restrictions: Unsaved ▼ — 112    [Delete]    [Save] — 110

Test Code
0  0  0  1  —  6  3  8  2
— 104

[Send Press-to-Test] — 106    [Cancel] — 108

Press-to-Test Configuration

Press-to-Test

Select the functionality that you would like to restrict on all connected handhelds. Press-to-Test also prevents access to pre-existing documents, folders, and Scratchpad data.

Default Angle Setting: [Degree ▼] — 103    CAS Mode: [Off ▼] — 105

☑ Select/Unselect All

☑ Limited geometry functions
☑ Disable function and conic grab and move, and disable change of equation form
☑ Disable vector functions, including eigenvectors and eigenvalues
☑ Disable "isPrime" function
☑ Disable differential equation functionality
☑ Disable inequality graphing ☑ Disable 3D graphing
☑ Disable implicit graphing, conic templates, conic analysis and geometric conics
☑ Limit trigonometric functions
☑ Disable logbx template and summation functions
☑ Disable Polynomial Root Finder and Simultaneous Equation Solver
☑ Disable Numerical Solver — 107

102

Saved Restrictions [Unsaved ▼] — 112    [Delete]    [Save] — 110

Test Code 0 0 0 3 — 2 7 6 6

104

106 — [Send Press-to-Test]    [Cancel] — 108

100

Press-to-Test Configuration

Select the functionality that you would like to restrict on all connected handhelds. Press-to-Test also prevents access to pre-existing documents, folders, and Scratchpad data.

Default Angle Setting: [Degree ▶] — 103    CAS Mode: [Off ▶] — 105

☑ Select/Unselect All

☑ Limited geometry functions

☑ Disable function and conic grab and move, and disable change of equation form

☑ Disable vector functions, including eigenvectors and eigenvalues

☑ Disable 3D graphing

☑ Disable implicit graphing, conic templates, conic analysis and geometric conics ☑ Limit trigonometric functions ☑ Disa ...nctions ☑ Disa ...ultaneous — 113

☑ Disa

⊘ Warning  ✕

⚠ All handhelds will restart.
Press-to-Test content will be deleted from handhelds already in Press-to-Test.

[Send Press-to-Test]   [Cancel]

Saved Restrictions [Unsaved ▶] — 112

[Delete]   [Save] — 110

Test Code: 0  0  0  3  —  2  7  6  6 — 104

[Send Press-to-Test] — 106    [Cancel] — 108

FIG. 1D

Test Mode Configuration

Test Mode

Select the functionality that you would like to restrict. Test Mode also prevents access to pre-existing documents, folders, and Scratchpad data.

☐ Select/Unselect All        Default Angle: [Degree ▼] — 303    CAS Mode: [Off ▼] — 305

☑ Limited geometry functions
☑ Disable function and conic grab and move, and disable change of equation form
☑ Disable vector functions, including eigenvectors and eigenvalues
☑ Disable "isPrime" function
☑ Disable differential equation functionality
☑ Disable inequality graphing
☑ Disable 3D graphing ☑ Disable implicit graphing, conic templates, conic analysis and geometric conics
☑ Limit trigonometric functions
☑ Disable logbx template and summation functions
☑ Disable Polynomial Root Finder and Simultaneous Equation Solver
☐ Disable Numerical Solver

— 302

Saved Restrictions [TI Factory Default ▼] — 312     [Delete]     [Save] — 310

Test Code

0   0   0   1   —   6   3   8   2

— 304              306 — [Enter Test Mode]    [Cancel] — 308

FIG. 3A

TEST CODES FOR SECURE TEST MODE ON MATH ASSISTANCE DEVICES

CROSS-REFERENCE TO RELATED APPLICATIONS

This application claims benefit of U.S. Provisional Patent Application No. 63/116,310 filed Nov. 20, 2020, which is incorporated herein by reference in its entirety.

BACKGROUND

To support examination policies, math assistance devices such as handheld calculators and math software executing on other platforms, e.g., desktop computers, laptops, and tablets, can be placed in a secure test mode that temporarily disables some functionality and, depending on the capabilities of a device, configures some settings in accordance with the examination policies. The particular functionality restrictions and settings for examinations may vary widely based on guidelines from policy makers, examination boards, schools, and others responsible for examination administration.

Current mechanisms for configuring and verifying secure test modes include setting and verifying each restriction/mode on each individual platform, a process that can be time consuming, error prone, and difficult to mass distribute. In addition, the steps to configure and verify secure test modes may differ for math assistance devices with different functionality, leading to inconsistent configuration of restrictions and test modes.

SUMMARY

Embodiments of the present disclosure relate to methods and apparatus for test codes for secure test mode on math assistance devices. In one aspect, a method for test configuration on a first math assistance device is provided that includes receiving a test code by the first math assistance device, wherein the test code includes one or more functionality restrictions, and entering secure test mode on the first math assistance device with the one or more functionality restrictions.

In one aspect, a math assistance device is provided that includes a non-transitory computer-readable medium storing software instructions to receive a test code by the math assistance device, wherein the test code comprises one or more functionality restrictions, and enter secure test mode on the math assistance device with the one or more functionality restrictions, and at least one processor coupled to the non-transitory computer-readable medium to execute the software instructions.

In one aspect, a method for generating a test code is provided that includes displaying a test configuration interface on a math assistance device, wherein the test configuration interface comprises a plurality of functionality restrictions, receiving user selection of one or more functionality restrictions in the plurality of functionality restrictions, and generating a test code corresponding to the one or more functionality restrictions.

BRIEF DESCRIPTION OF THE DRAWINGS

FIGS. 1A-1D are an example illustrating generation and optional transmission of a test code;

FIGS. 3A-3D are an example illustrating generation and use of a test code;

DETAILED DESCRIPTION

Figure 1C:
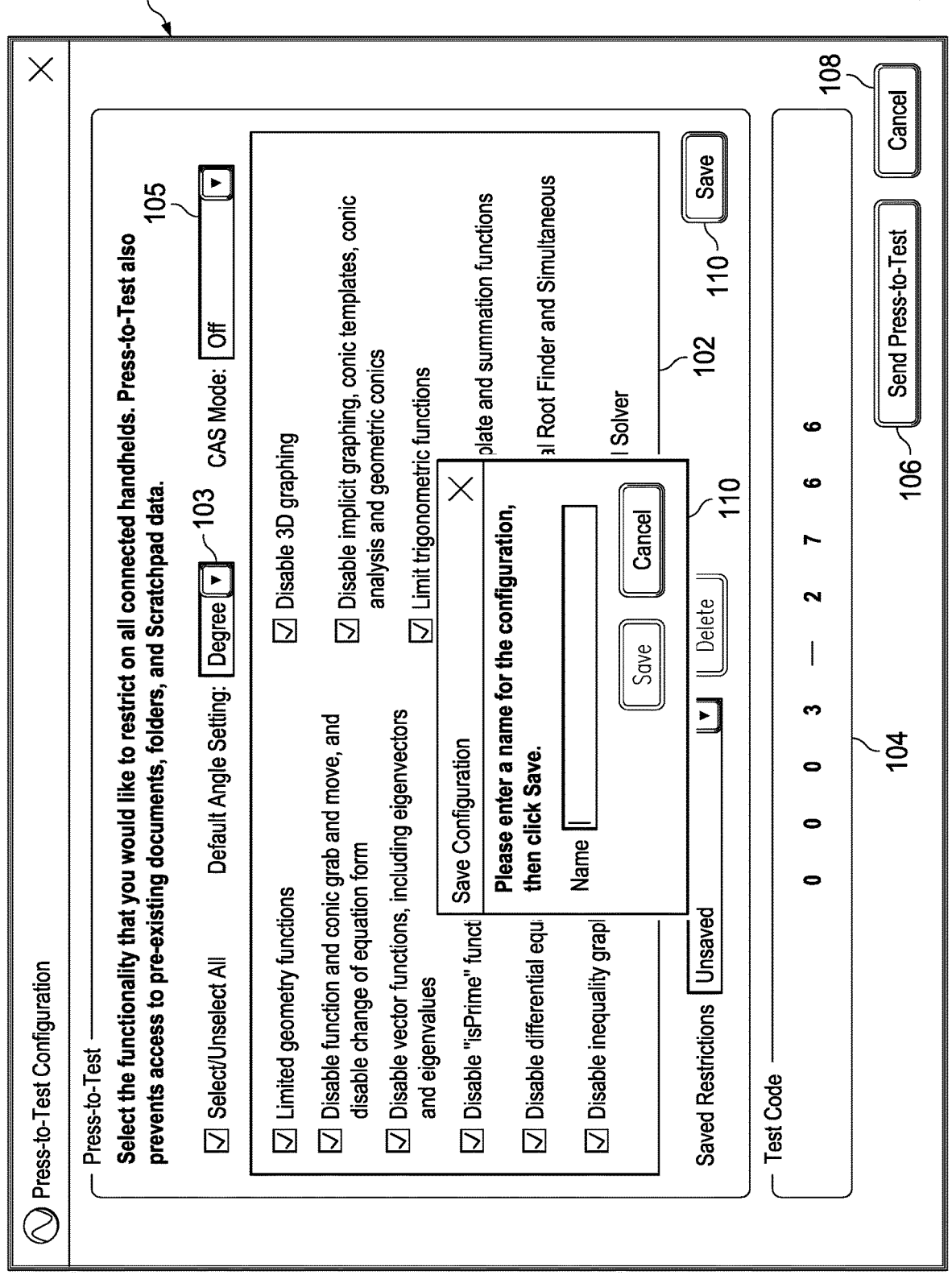

Specific embodiments of the disclosure are described herein in detail with reference to the accompanying figures. Like elements in the various figures are denoted by like reference numerals for consistency.

Embodiments of the disclosure provide for using test codes to enter a secure test mode on math assistance devices, e.g., handheld graphing calculators and math software executing on digital devices such as desktop computers, a laptop computer, and tablets. Each test code is representative of a unique combination of functionality restrictions. In some such embodiments, a test code may also be representative of one or more test settings. As is explained in more detail herein, a user of a math assistance device can enter a valid test code and cause the handheld calculator or math software to enter a secure test mode in which the functionality restrictions (and test settings, if supported) represented by the test code are in effect. Further, in some embodiments, a test code can be transmitted to connected handheld calculators to cause the handheld calculators to enter a secure test mode in which the functionality restrictions (and test settings, if supported) represented by the test code are in effect. In addition, in some embodiments, the ability to generate test codes is provided in which a user can select the desired functionality restrictions (and test settings, if supported) and receive a corresponding test code.

For illustrative purposes, examples described herein are based on the TI-Nspire™ CX II family of handheld graphing calculators and the TI-Nspire™ CX Premium Teacher Software and the TI-Nspire™ CX Student Software, math software available from Texas Instruments Incorporated. The TI-Nspire™ teacher and student software executes on digital devices such as a laptop computer, a desktop computer, or a tablet, and enables users to perform the functions of a TI-Nspire™ handheld graphing calculator on a digital device. That is, the TI-Nspire™ teacher and student math software emulates the operation of a TI-Nspire™ handheld graphing calculator. The teacher version of the TI-Nspire™ software also includes additional functionality for instructional purposes and communication with TI-Nspire™ handheld graphing calculators connected to the software.

In some embodiments, a test code representative of a desired set of functionality restrictions and test settings for an examination can be generated on a math assistance device, e.g., a handheld graphing calculator or by calculator emulation software. Examples of functionality that may need to be restricted for a given examination include geometry functions, vector functions, differential equation functionality, inequality graphing, trigonometric functions, etc. The particular functionality that can be restricted and/or test settings may vary by the capabilities of the math assistance device.

FIGS. 1A-1D are an example illustrating generation and optional transmission of a test code to one or more TI-Nspire™ handheld graphing calculators using TI-Nspire™ CX Premium Teacher Software, which may be referred to as teacher software herein. As shown in FIG. 1A, a user wishing to generate a test code is presented with a test configuration dialog box 100 including a restriction selection area 102 and a test code display area 104. The user may also specify test settings for the default angle units 103, i.e., degree or radian, and the Computer Algebra System (CAS) mode 105. As the name implies, CAS enables a handheld calculator or calculator emulation software to perform algebraic operations such as factoring, solving for a variable, giving exact answers, and simplifying long expressions. The CAS modes are "on", "off", or "exact arithmetic" in which CAS is off with exact results enabled.

The restriction selection area 102 displays the available functionality restrictions and allows the user to specify which functionality restrictions are desired via check boxes displayed in association with the functionality restrictions. The test code display area 104 displays the test code corresponding to the selected functionality restrictions and the values of the test settings 103, 105. If the user changes the value of a test setting 103, 105 or a check box for a restriction, the test code displayed in the test code display area 104 also changes. For example, as shown in FIG. 1A, the "Disable Numerical Solver" restriction 107 is not selected and the test code for the selected functionality restrictions and setting values is 0001-6382. As illustrated in FIG. 1B, if the user selects the "Disable Numerical Solver" restriction 107, the test code changes to 0003-2766.

A unique test code is generated for each possible combination of test setting values and functionality restriction selections. In some embodiments, a test code is generated as follows. A test code is represented as a set of binary digits in which one or more binary digits represents each test setting or functionality restriction. For example, FIG. 1A includes two test settings and twelve functionality restrictions. Each of the twelve functionality restrictions is either selected or not selected and thus a single binary digit is sufficient to represent the selection state of each functionality restriction. Similarly, the angle test setting 103 has two possible values and can be represented by a single binary digit. The CAS mode test setting 105 has three possible values and is therefore represented by two binary digits. Accordingly, the binary representation of a test code for this example includes fifteen significant binary digits, one for the angle setting, two for the CAS mode test setting, and one for each of the twelve functionality restrictions.

In the binary representation of the test code, the rightmost binary digit of the fifteen binary digits represents the angle test setting 103, the next two binary digits represent the CAS mode test setting 105, and the next twelve binary digits represent the selection states of each of the functionality restrictions. The binary representation is converted to decimal for display in the test code area 104. For example, the binary representation of the test code 0001-6382 shown in the test code display area 104 of FIG. 1A is 0011111111111110 (truncated to sixteen bits). The rightmost binary digit is 0, indicating that the angle test setting is degree, the next two binary digits are 11, indicating that the CAS mode test setting is "off", the next eleven binary digits are all set to 1, indicating that the corresponding restriction is selected, and the fifteenth binary digit from the right, which corresponds to the "Disable Numerical Solver" restriction 107, is set to 0 to indicate that this restriction is not selected. The sixteenth bit is unused and is set to 0. As shown in FIG. 1B, if the user selects the "Disable Numerical Solver" restriction 107, the test code displayed in the test code display area 104 changes to 0003-2766, which is the decimal value of 0111111111111110. Note that the value of the fifteenth binary digit from the right was changed to indicate the selection of the "Disable Numerical Solver" restriction 107.

This binary test code representation can be expanded to include additional functionality restrictions and/or test settings by adding more binary digits on the left end of the binary representation. For example, if a thirteenth functionality restriction is added, a sixteenth binary digit from the right can be added for the new functionality restriction. The meaning of the other binary digits remains unchanged and all previous test codes generated before the addition of the new functionality restriction remain valid.

Referring again to FIG. 1A, the user can save the test code by selecting the "Save" button 110. As illustrated in FIG. 1C, if the user selects the "Save" button 110, the user is presented with a dialog box 110 that allows the user to enter a name for the test code. After the user enters a name, the user can select the "Save" button in the dialog box to cause the test code to be saved with the user specified name.

Referring again to FIG. 1A, the user can view and select a saved test code by selecting the saved restrictions drop down menu 112. If the user selects a saved test code from the drop down menu 112, the test settings 103, 105 and the check boxes associated with the functionality restrictions in the restriction selection area 102 are updated as needed to correspond to the selected saved test code. Further, the test code in the test code display area 104 is changed to the saved test code.

Referring to FIG. 1D, once the user has specified the desired test configuration and received a test code, the user can select the "Cancel" button 108 to exit. The user may also optionally cause the test code to be transmitted to one or more TI-Nspire™ handheld graphing calculators connected to the device executing the TI-Nspire™ CX Premium Teacher Software. The connection between a TI-Nspire™ handheld graphing calculator and the computer maybe be wired, e.g., via a direct connection using a USB cable or a TI-Nspire™ docking station, or wireless, e.g., via a TI-Nspire™ Navigator™ Cradle or a TI-Nspire™ CX Wireless Network Adapter. The user can select the "Send Press-to-Test" button 106 to initiate the transmission of the test code. Selection of the button 106 causes the display of a warning dialog box 113. User selection of the "Send Press-to-Test" button in the warning dialog box 113 causes the test code to be transmitted to any connected TI-Nspire™ handheld graphing calculators. The connected calculators will restart, decode the transmitted test code, and enter a secure test mode with the functionality restrictions and test settings specified by the decoded test code.

In some embodiments, the teacher software may allow for generation of a test code including functionality restrictions and/or test settings not supported by one or more of the connected calculators. For example, the teacher software may be a newer version than the operating system on a connected calculator and may allow for selection of added functionality restrictions not implemented in the version of the operating system installed on the connected calculator. In such cases, the teacher software may display a visual indication to the user that a connected calculator has an older version of the operating system. If the test code is transmitted to such a connected calculator, any binary digits of the test code corresponding to the new functionality restrictions are ignored and the connected calculator enters a secure test mode with the remainder of the functionality restrictions and test settings specified by the transmitted test code.

Figure 2A:
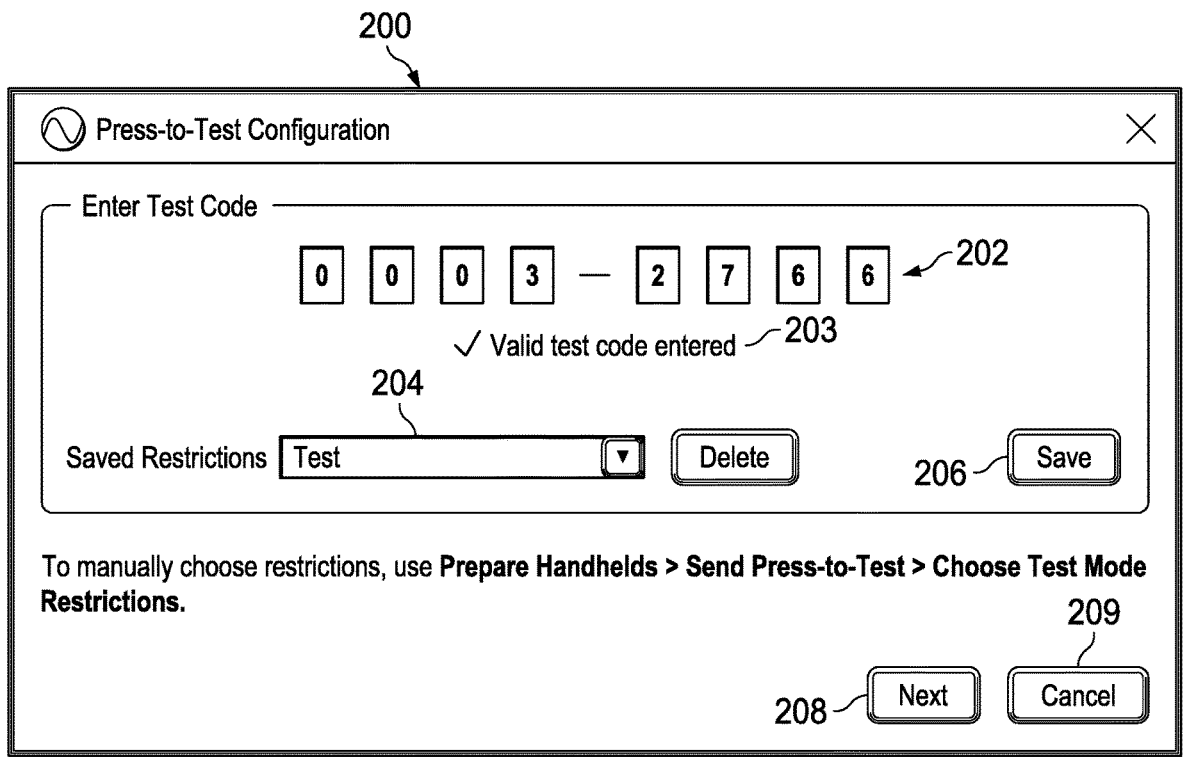
FIGS. 2A-2D are an example illustrating manual entry or selection of a test code and transmission of the test code.

FIGS. 2A-2D are an example illustrating manual entry or selection of a test code and transmission of the test code to one or more TI-Nspire™ handheld graphing calculators using TI-Nspire™ CX Premium Teacher Software. As shown in FIG. 2A, a user wishing to manually enter a test code or select a previously defined and saved test code is presented with a test code entry dialog box 200. The user can manually enter a test code in the test code display area 202. If a manually entered test code is valid, a message 203 is displayed in the test code entry dialog box 200 to confirm the validity.

Figure 2B:
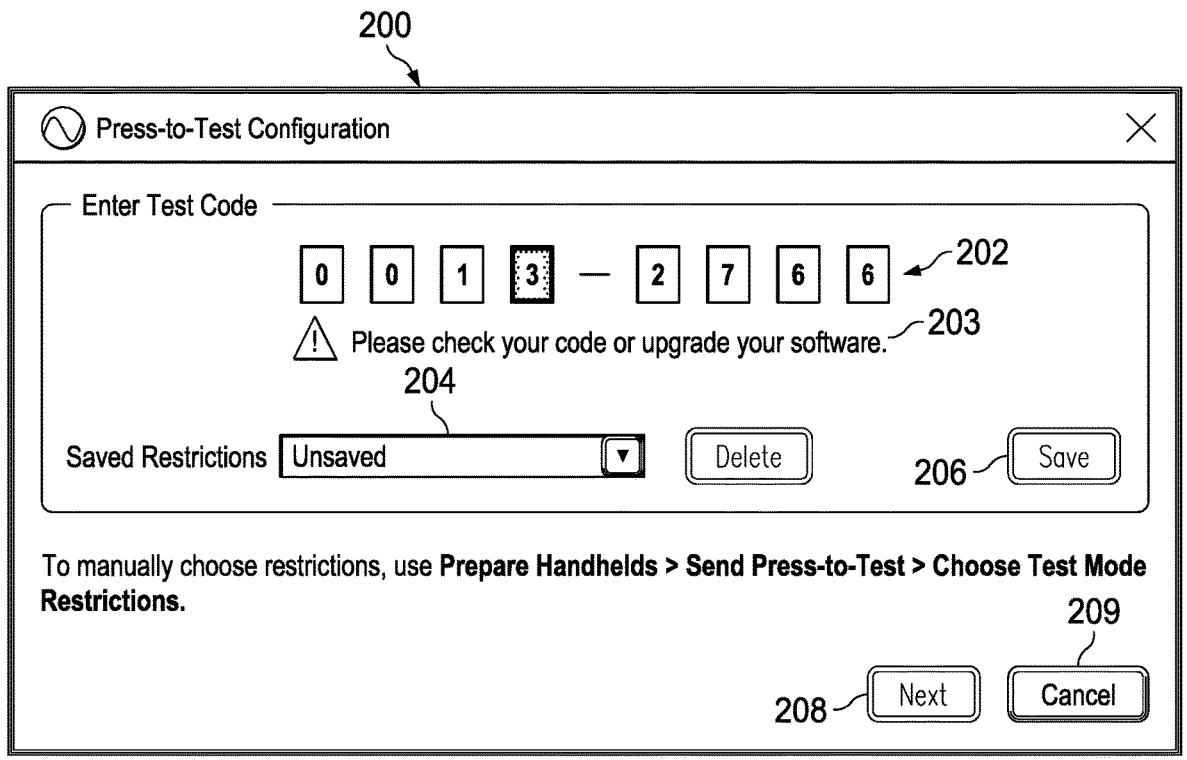

As illustrated in FIG. 2B, if a manually entered test code is not valid, the message 203 indicates to the user that the test code is not valid. For example, a test code is not valid if the decimal value entered is greater than the largest valid test code. As previously described, a test code may be represented as fifteen binary digits representing twelve restrictions and two test settings, which, if all the binary digits are one, has a maximum decimal value of 32767. Any decimal value larger than 32767 is an invalid test code. The message 203 suggests that the user check the test code entered or upgrade the software. The user may need to upgrade the teacher software because one or more new functionality restrictions and/or test settings may have been added in a new version of the software that was used to generate the entered test code and the entered test code would be valid in the new version. If the user has entered an invalid test code in error, the user may modify the entered test code in the test code display area 202 and the modified test code will be checked for validity. The user may also select the "Cancel" button 209 to cancel the test code entry.

Referring again to FIG. 2A, alternatively, the user can view and select a saved test code by selecting the saved restrictions drop down menu 204. If the user selects the name of a saved test code from the drop down menu 204, the test code in the test code display area 202 is changed to the test code corresponding to the selected name.

The user can save the displayed test code by selecting the "Save" button 206. If the user selects the "Save" button 206, the user is presented with a dialog box that allows the user to enter a name for the test code. An example of such a dialog box is shown in FIG. 1C. After the user enters a name, the user can select the save button in the dialog box to cause the test code to be saved with the user specified name.

Figure 2C:
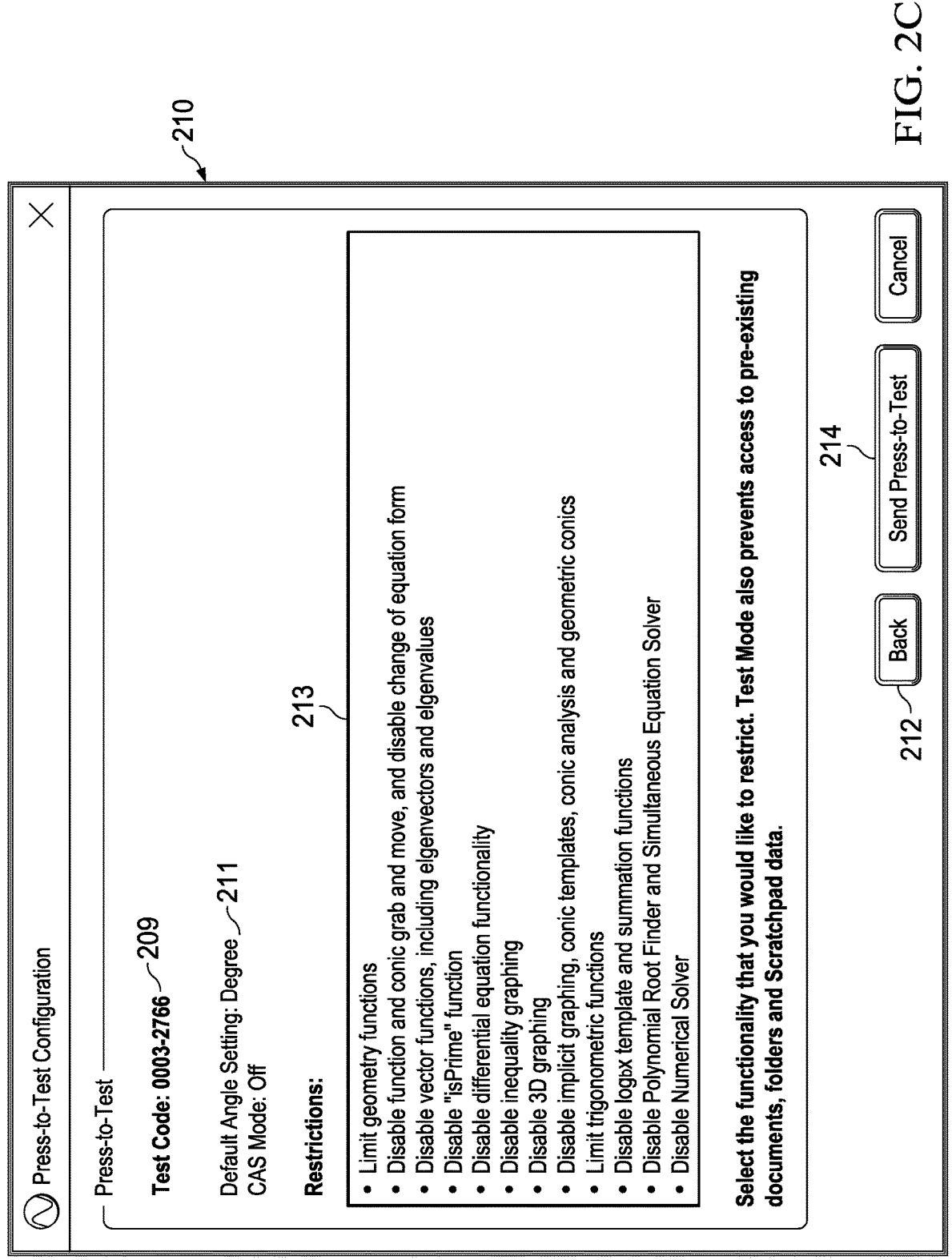

Once the user has manually entered or selected the desired test code, the user can optionally cause the test code to be transmitted to one or more TI-Nspire™ handheld graphing calculators connected to the digital device executing the TI-Nspire™ CX Premium Teacher Software. As shown in FIG. 2C, user selection of the "Next" button 208 causes a test configuration dialog box 210 to be displayed. The test configuration dialog box 210 displays the test code 209 and the test settings 211 and functionality restrictions 213 corresponding to the test code. The user can select the "Back" button 212 to return to the previous dialog box 200.

Figure 2D:
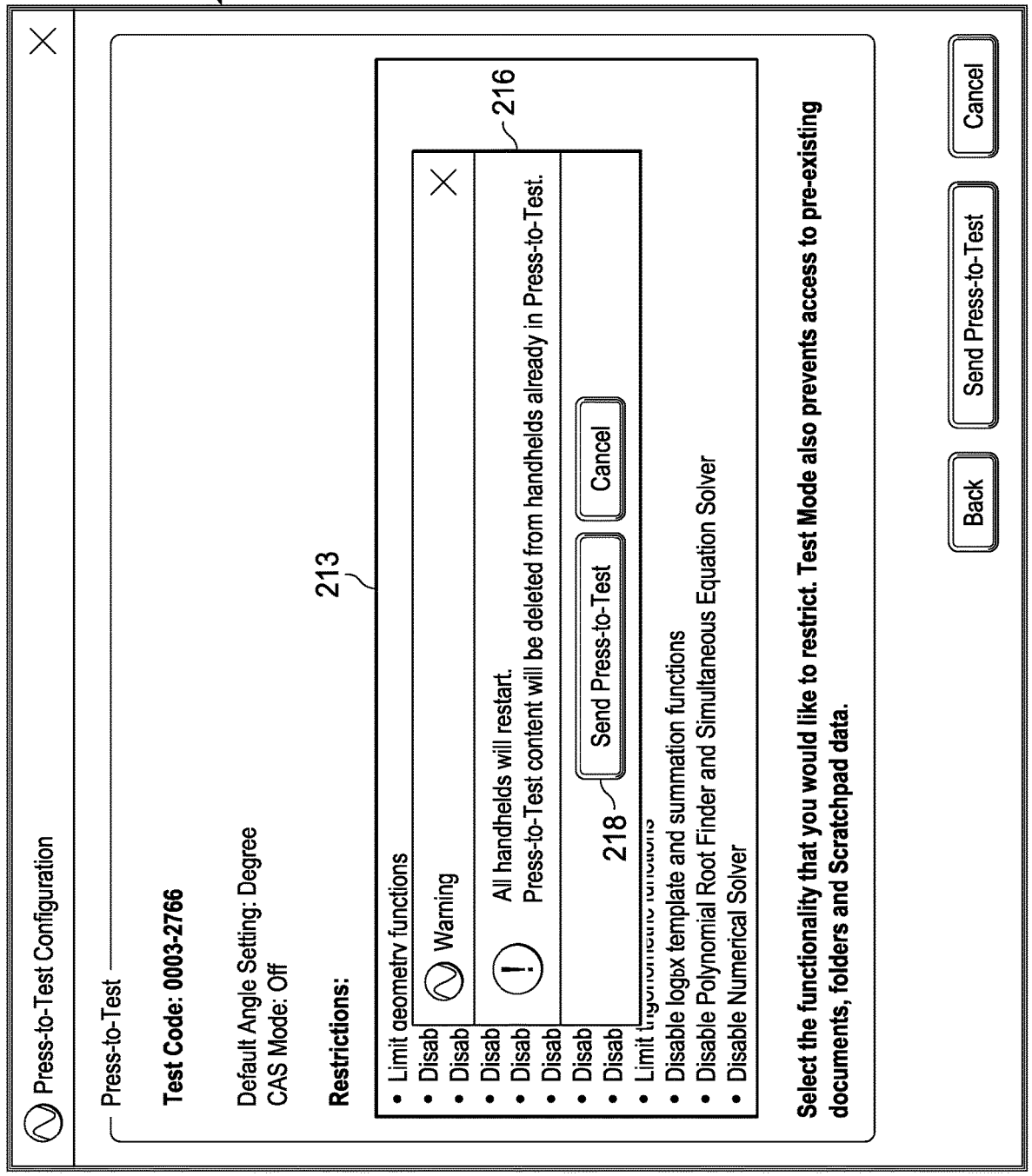

The user can select the "Send Press-to-Test" button 214 to initiate the transmission of the test code. As illustrated in FIG. 2D, selection of the button 214 causes the display of a warning dialog box 216. User selection of the "Send Press-to-Test" button 218 in the warning dialog box 216 causes the test code to be transmitted to any connected TI-Nspire™ handheld graphing calculators. The connected calculators will restart, decode the transmitted test code, and enter a secure test mode with the functionality restrictions and test settings specified by the decoded test code.

In some embodiments, the manually entered test code may be valid in the teacher software but may include functionality restrictions and/or test settings not supported by one or more of the connected calculators. For example, the teacher software may be a newer version than the operating system on a connected calculator and may support added functionality restrictions not implemented in the version of the operating system installed on the connected calculator. In such cases, the teacher software may display a visual indication to the user that a connected calculator has an older version of the operating system. If the test code is transmitted to such a connected calculator, any binary digits of the test code corresponding to the new functionality restrictions are ignored and the connected calculator enters a secure test mode with the remainder of the functionality restrictions and test settings specified by the transmitted test code.

Figure 3B:
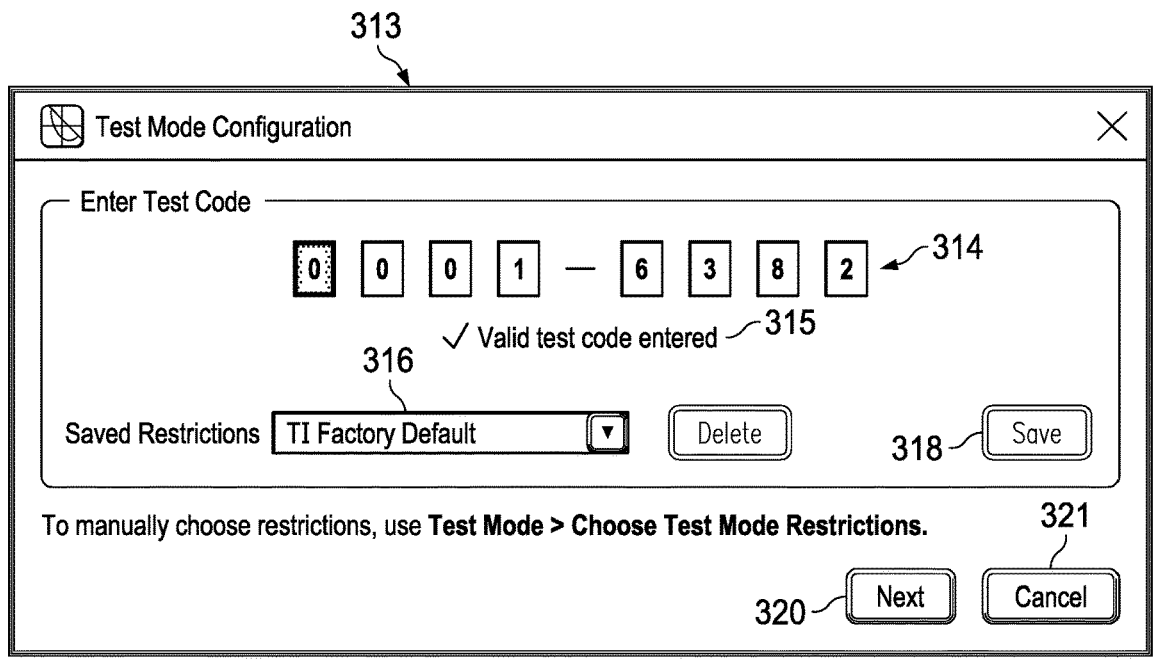

FIGS. 3A-3D are an example illustrating generation and use of a test code using TI-Nspire™ CX Student Software, which may be referred to as student software herein. As shown in FIG. 3A, a user wishing to generate a test code is presented with a test configuration dialog box 300 including a restriction selection area 302 and a test code display area 304. The user may also specify test settings for the default angle units 303, i.e., degree or radian, and the Computer Algebra System (CAS) mode 305.

The restriction selection area 302 displays the available functionality restrictions and allows the user to specify which functionality restrictions are desired via check boxes displayed in association with the functionality restrictions. The test code display area 304 displays the test code corresponding to the selected functionality restrictions and the values of the test settings 303, 305. Similar to the example of FIGS. 1A-1D, if the user changes the value of a test setting 303, 305 or a check box for a restriction, the test code displayed in the test code display area 304 also changes. A unique test code is generated for each possible combination of test setting values and restriction selections. In some embodiments, a test code is generated as previously described herein.

Similar to the example of FIGS. 1A-1D, the user can save the test code by selecting the "Save" button 310. If the user selects the "Save" button 310, the user is presented with a dialog box (see FIG. 1C) that allows the user to enter a name for the test code. After the user enters a name, the user can select the "Save" button in the dialog box to cause the test code to be saved with the user specified name.

Similar to the example of FIGS. 1A-1D, the user can view and select a saved test code by selecting the saved restrictions drop down menu 312. If the user selects a saved test code from the drop down menu 312, the test settings 303, 305 and the check boxes associated with the functionality restrictions in the restriction selection area 302 are updated as needed to correspond to the selected saved test code. Further, the test code in the test code display area 304 is changed to the saved test code.

Once the user has specified the desired test configuration and received a test code, the user can select the "Cancel" button 308 to exit or can select the "Enter Test Mode" button 306 to cause the student software to enter a secure test mode with the test settings and functionality restrictions corresponding to the test code.

The user can also manually enter a test code or select a saved test code. As shown in FIG. 3B, a user wishing to manually enter a test code or select a previously defined and saved test code is presented with a test code entry dialog box 313. The user can manually enter a test code in the test code display area 314. If a manually entered test code is valid, a message 315 is displayed in the test code entry dialog box 313 to confirm the validity. Otherwise, similar to the example of FIG. 2B, the message 315 indicates to the user that the test code is not valid and suggests that the user check the test code entered or upgrade the software. The user may need to upgrade the student software because one or more new functionality restrictions and/or test settings may have been added in a new version of software that was used to generate the entered test code and the entered test code would be valid in the new version of student software. If the user has entered an invalid test code in error, the user may modify the entered test code in the test code display area 314 and the modified test code will be checked for validity. The user may also select the "Cancel" button 321 to cancel the test code entry.

Alternatively, the user can view and select a saved test code by selecting the saved restrictions drop down menu 316. If the user selects the name of a saved test code from the drop down menu 316, the test code in the test code display area 314 is changed to the test code corresponding to the selected name.

The user can save the displayed test code by selecting the "Save" button 318. If the user selects the "Save" button 318, the user is presented with a dialog box that allows the user to enter a name for the test code. An example of such a dialog box is shown in FIG. 1C. After the user enters a name, the user can select the "Save" button in the dialog box to cause the test code to be saved with the user specified name.

Once the user has manually entered or selected the desired test code, the user can select the "Next" button 320 to initiate entry into a secure test mode with the functionality restrictions and test settings corresponding to the test code. As shown in FIG. 3C, user selection of the "Next" button 320 causes a test configuration dialog box 322 to be displayed. The test configuration dialog box 322 displays the test code 321 and the test settings 323 and functionality restrictions 325 corresponding to the test code. The user can select the "Back" button 324 to return to the previous dialog box 313. The user can select the "Enter Test Mode" button 326 to cause the student software to enter a secure test mode with the test settings and functionality restrictions corresponding to the test code. The user can also select the "Cancel" button 327 to cancel the test mode entry.

Figure 3D:
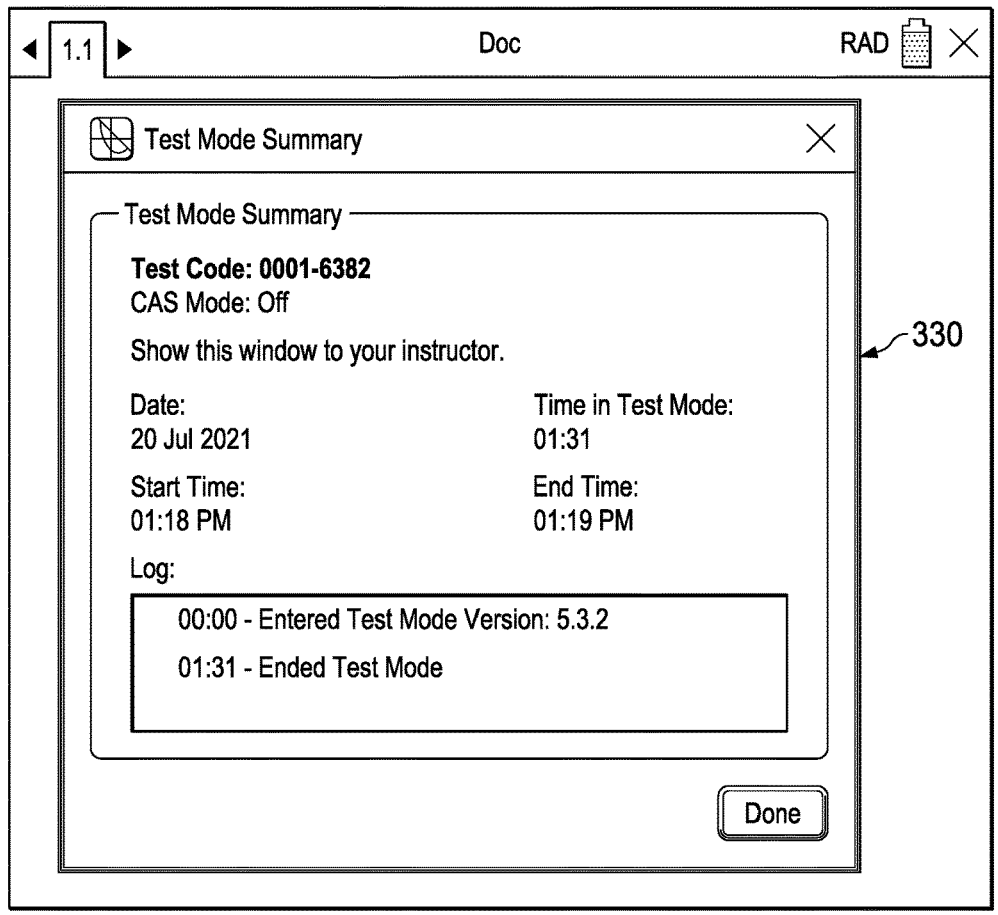
Figure 3C:
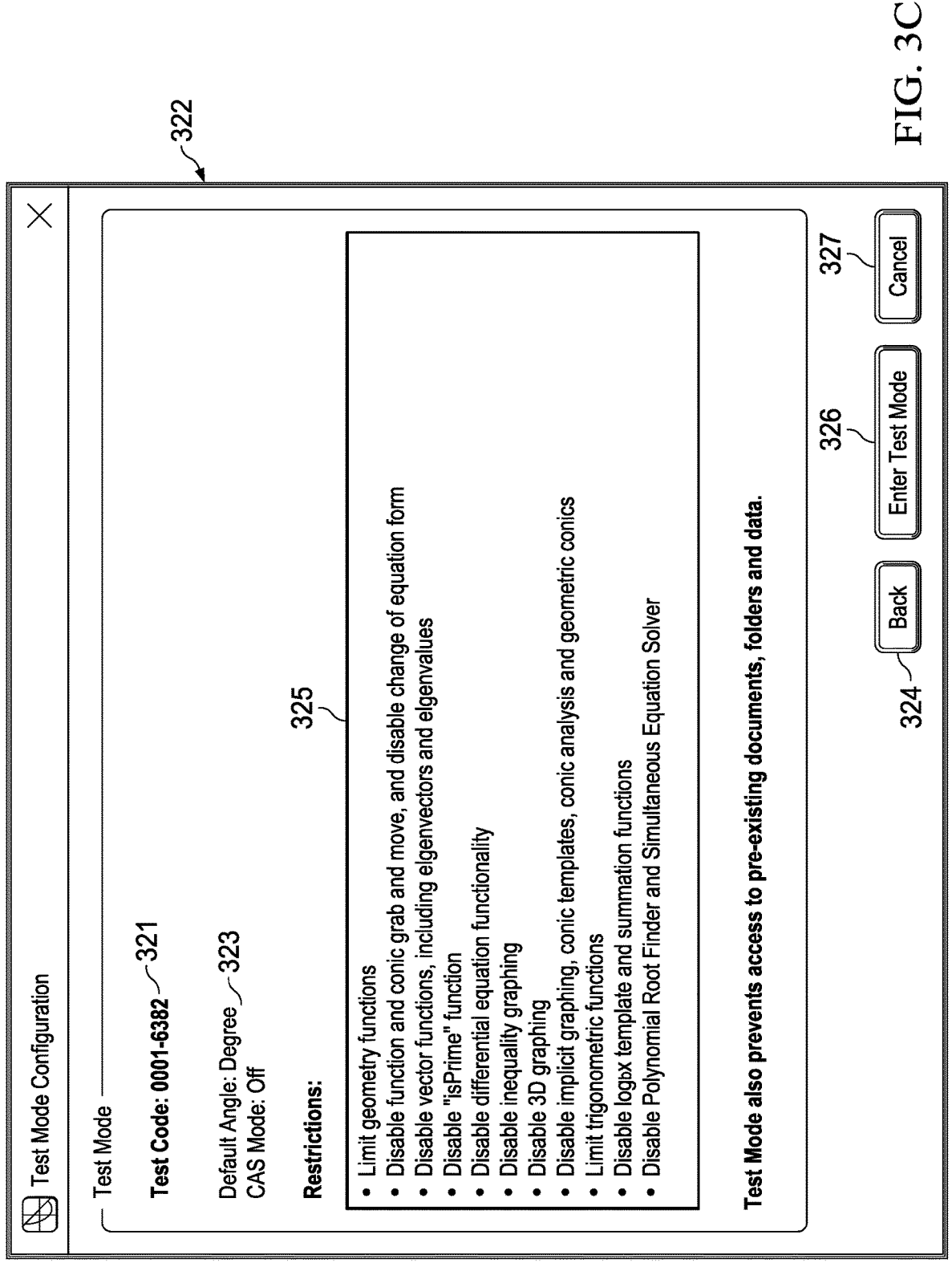

As illustrated in FIG. 3D, when the user causes the student software to exit the secure test mode, a test mode summary dialog box 330 is displayed. The summary dialog box 330 includes the test code used, the date the secure test mode was entered as well as the start time and end time of the secure test mode and the elapsed time, and a log.

Figure 4A:
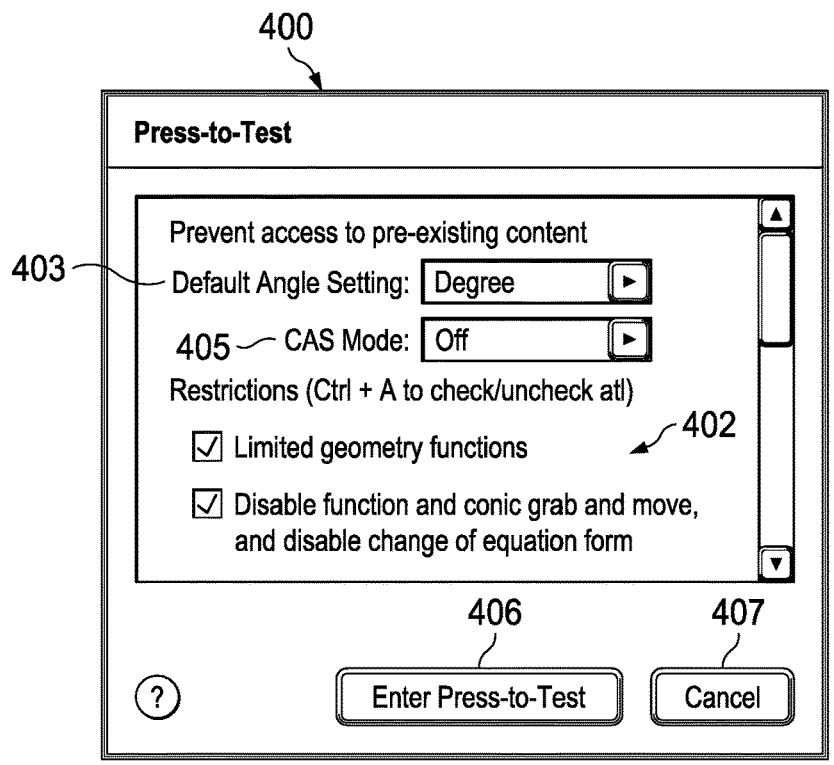
FIGS. 4A-4F are an example illustrating generation and use of a test code.

FIGS. 4A-4F are an example illustrating generation and use of a test code on a TI-Nspire™ graphing handheld calculator. As shown in FIG. 4A, a user wishing to generate a test code is presented with a test configuration dialog box 400 including a restriction selection area 402. The user may also specify test settings for the default angle units 403, i.e., degree or radian, and the Computer Algebra System (CAS) mode 405. The restriction selection area 402 displays the available functionality restrictions and allows the user to specify which functionality restrictions are desired via check boxes displayed in association with the functionality restrictions. The user can select the "Cancel" button 407 to cancel the test configuration.

Figure 4B:
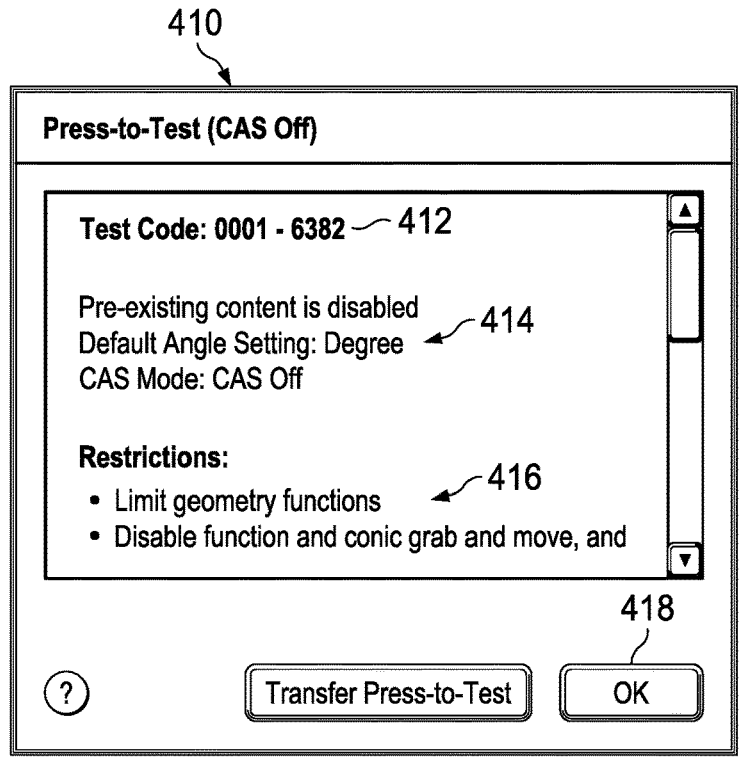
Figure 4C:
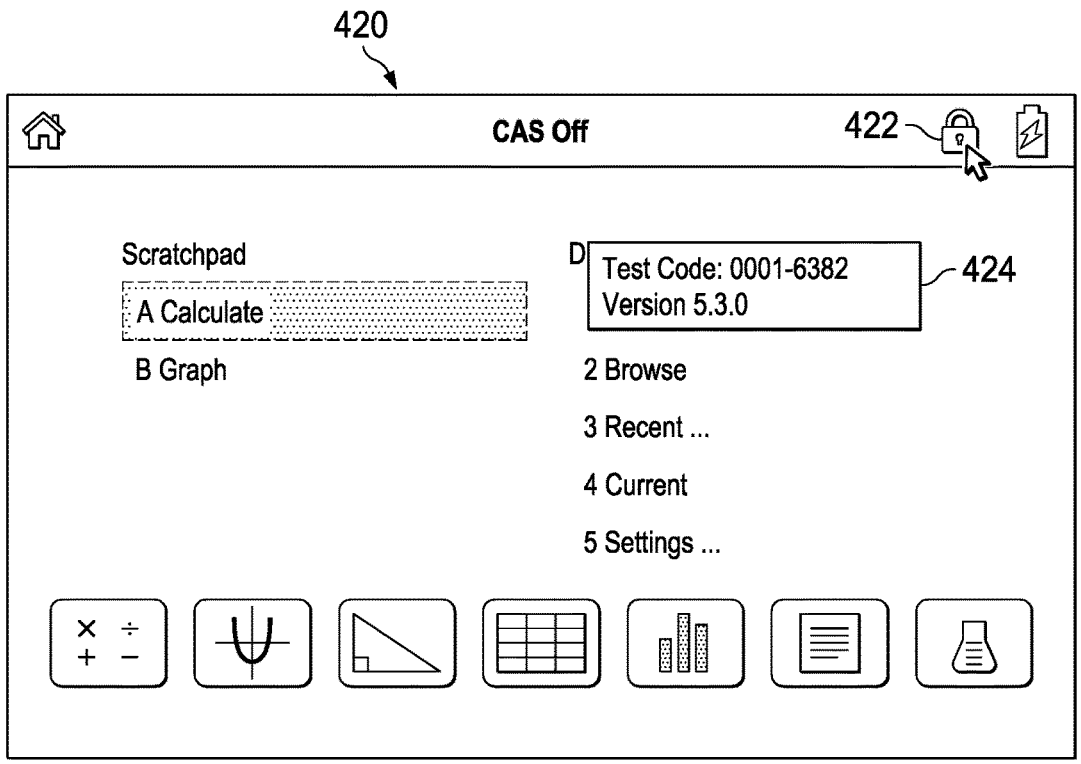

Once the user has specified the desired test configuration, the user can select the "Enter Press-to-Test" button 406 to cause the calculator to enter a secure test mode with the specified test settings and functionality restrictions. As shown in FIG. 4B, user selection of the "Enter Press-to-Test" button 406 causes a summary dialog box 410 to be displayed. The summary dialog box 410 displays the test code 412 corresponding to user selected functionality restrictions and the test settings 414 and functionality restrictions 416 corresponding to the test code 412. The user can select the "OK" button 418 to continue in secure test mode with the displayed test settings and functionality restrictions. As shown in FIG. 4C, when the user selects the "OK" button 418, a test home screen 420 is displayed. A lock icon 422 indicates that the calculator is in secure test mode. Hovering the cursor over the lock icon 422 displays the test code in effect.

Figure 4D:
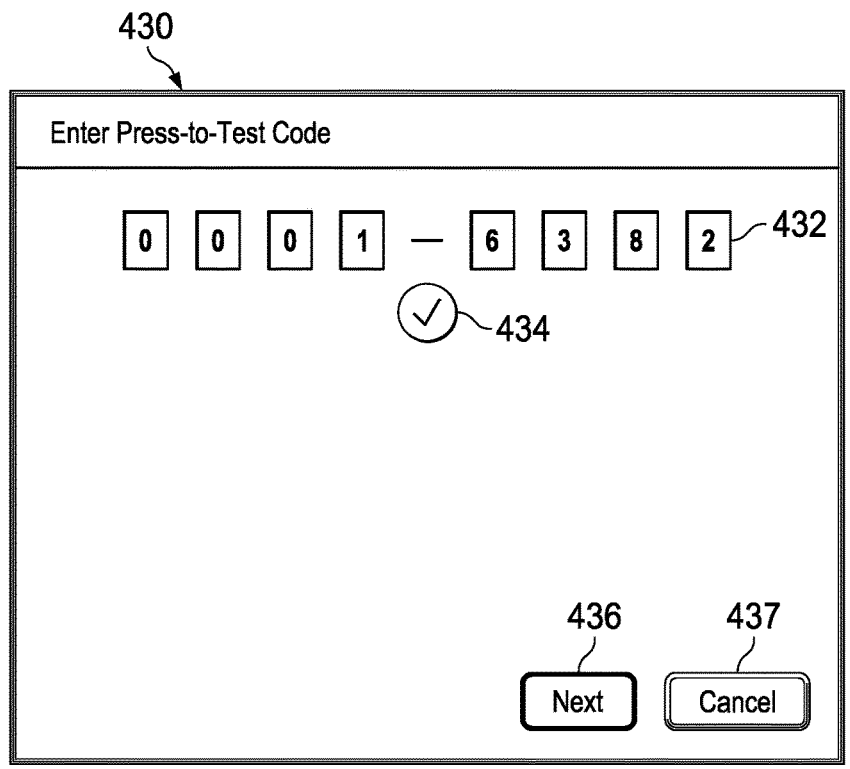
Figure 4E:
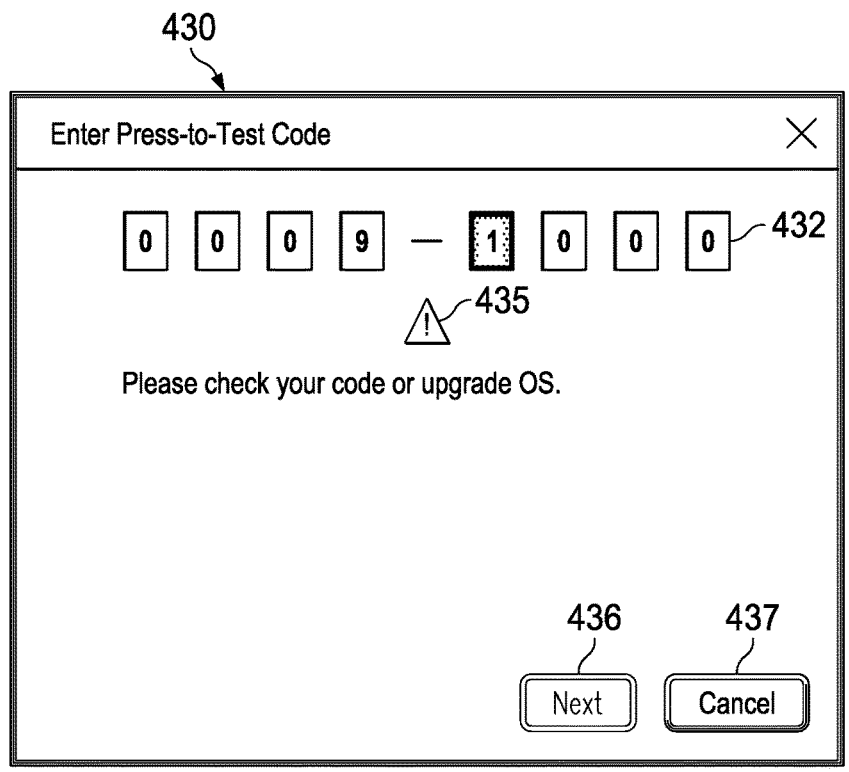

The user can also manually enter a test code. As shown in FIG. 4D, a user wishing to manually enter a test code is presented with a test code entry dialog box 430. The user can manually enter a test code in the test code display area 432. If a manually entered test code is valid, an indicator 434 is displayed in the test code entry dialog box 430 to confirm the validity. As shown in FIG. 4E, if a manually entered test code is not valid, an indicator 435 is displayed in the test code entry dialog box 430 along with accompanying text to suggesting that the user check the test code entered or upgrade the operating system. As previously described herein in reference to FIG. 2B, a test code may not be valid if the decimal value entered is greater than the largest valid test code. The user may need to upgrade the calculator operating system because one or more new functionality restrictions and/or test settings may have been added in a new version of the software that was used to generate the entered test code and the entered test code would be valid in the new version of the operating system. If the user has entered an invalid test code in error, the user may modify the entered test code in the test code display area 432 and the modified test code will be checked for validity. The user may also select the "Cancel" button 437 to cancel the test code entry.

Figure 4F:
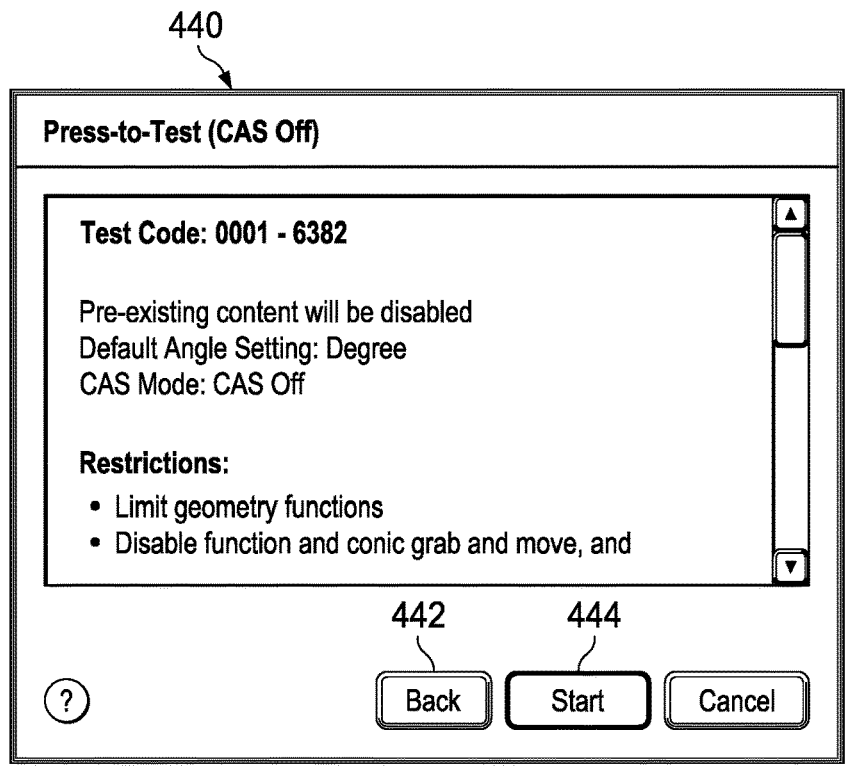

Once the user has manually entered a valid test code, the user can select the "Next" button 436 to initiate entry into a secure test mode with the functionality restrictions and settings corresponding to the test code. As shown in FIG. 4F, user selection of the "Next" button 436 causes a test configuration dialog box 440 to be displayed. The test configuration dialog box 440 displays the test code and the test settings and functionality restrictions corresponding to the test code. The user can select the "Back" button 442 to return to the previous dialog box 430. The user can select the "Start" button 444 to enter the secure test mode with the displayed functionality restrictions and test settings. User selection of the "Start" button 444 causes the summary dialog box 410 shown in FIG. 4B to be displayed.

Figure 5:
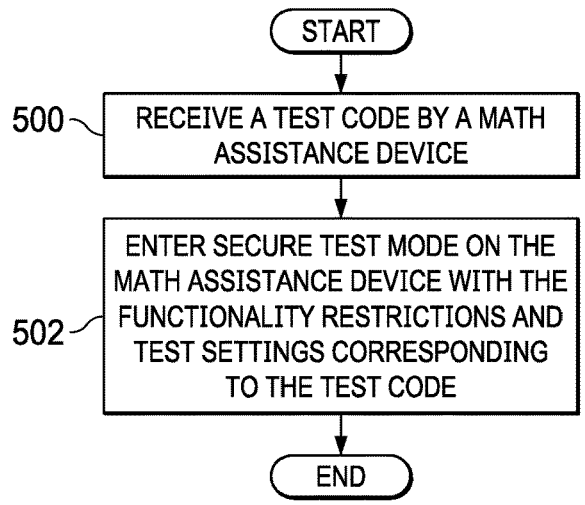
FIG. 5 is a flow diagram of a method for using a test code on a math assistance device.

FIG. 5 is a flow diagram of a method for using a test code on a math assistance device. Initially, a test code is received 500 by a math assistance device. In some embodiments, the test code may be received by manual entry of the test code by a user of the math assistance device. Examples of such manual entry are previously described herein in reference to FIGS. 3B and 4D. In some embodiments, the test code may be received responsive to user selection of functionality restrictions and test settings in a dialog box on the math assistance device. Examples of such a dialog box are previously described herein in reference to FIGS. 3A and 4A. In some embodiments, the test code may be received as a transmission from another math assistance device. An example of such transmission is previously described herein in reference to FIG. 1D.

In some embodiments, if the test code is received by manual entry, the test code is checked for validity. If the entered test code is valid, entry into secure test mode is allowed. In such embodiments, if the test code is invalid, entry into secure test mode is not allowed. An indication that the entered test code is invalid is displayed to the user along with text suggesting the user check the test code or upgrade the software or operating system on the math entry device. If the user has made a mistake in entering the test code, the user may modify the test code, which will again be checked for validity. Examples of testing test code validity after manual entry are previously described herein in reference to FIG. 3B and FIGS. 4D and 4E.

Secure test mode is then entered 502 on the math assistance device with the functionality restrictions and test settings corresponding to the received test code. Entering secure test mode may also include, for example, disabling external access capabilities of the math assistance device, if any, and access to existing files stored on the math assistance device.

In some embodiments, the user of the math assistance device causes the math assistance device to enter the secure test mode by selecting a button in a dialog box as previously described herein in reference to the examples of FIGS. 3A, 3C, 4A, and 4E. In some embodiments in which the user of the math assistance device manually enters the test code, the dialog box may include a summary of the functionality restrictions and test settings corresponding to the test code. Examples of such dialog box are previously described herein reference to FIGS. 3C and 4E. In some embodiments in which the test code is transmitted to the math assistance device, the math assistance device may automatically enter the secure test mode with the functionality restrictions and test settings corresponding to the test code without user input as previously described herein in reference to the example of FIG. 1D.

Figure 6:
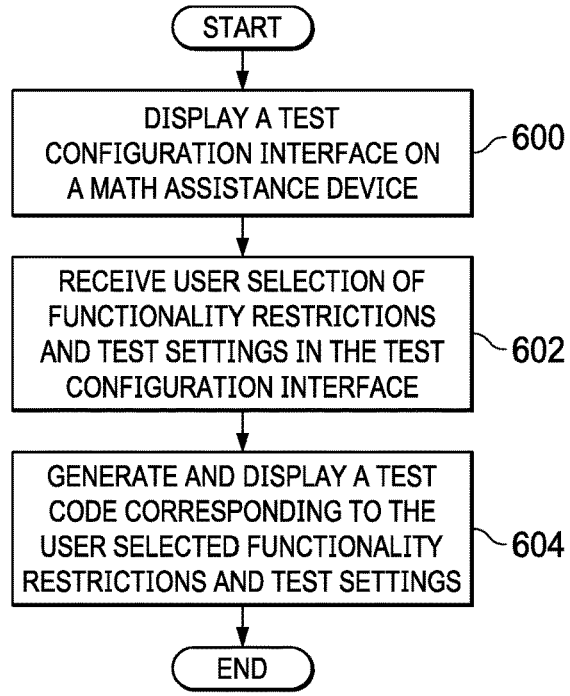
FIG. 6 is a flow diagram of a method for generating a test code on a math assistance device.

FIG. 6 is a flow diagram of a method for generating a test code on a math assistance device. Initially, a test configuration interface is displayed 600 on a math assistance device. The test configuration interface displays the functionality restrictions that may be selected and the test settings the user may set. Examples of a test configuration interface are previously described herein in reference to FIGS. 1A-1C, FIG. 3A, and FIG. 4A. The math assistance device then receives 602 the user selection of functionality restrictions and test settings and generates and displays a test code 604 corresponding to the user selections.

Figure 7:
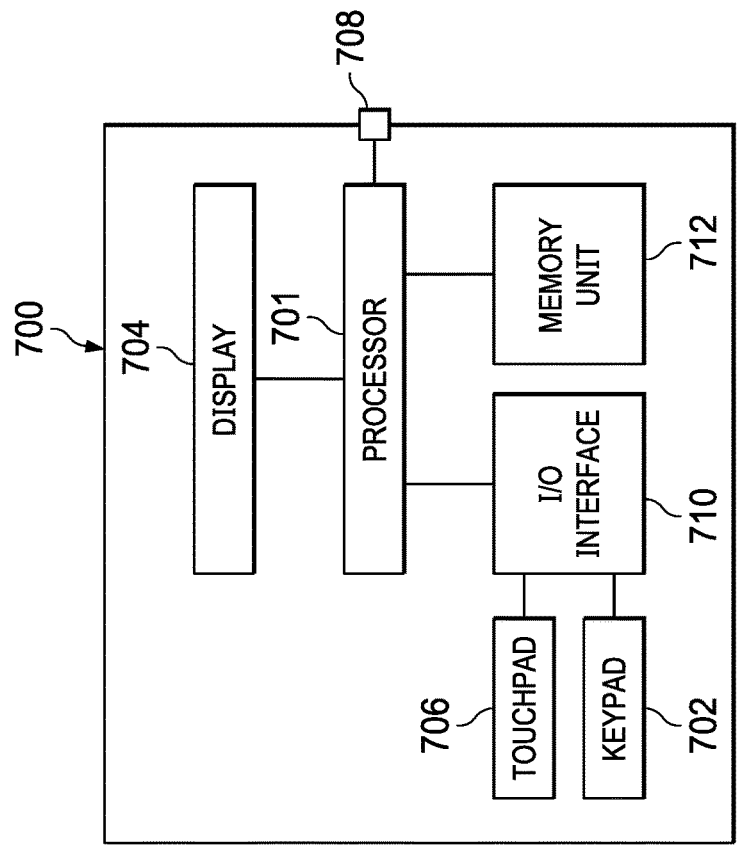
FIG. 7 is an example of a handheld graphing calculator configured to support test codes.
Figure 7:
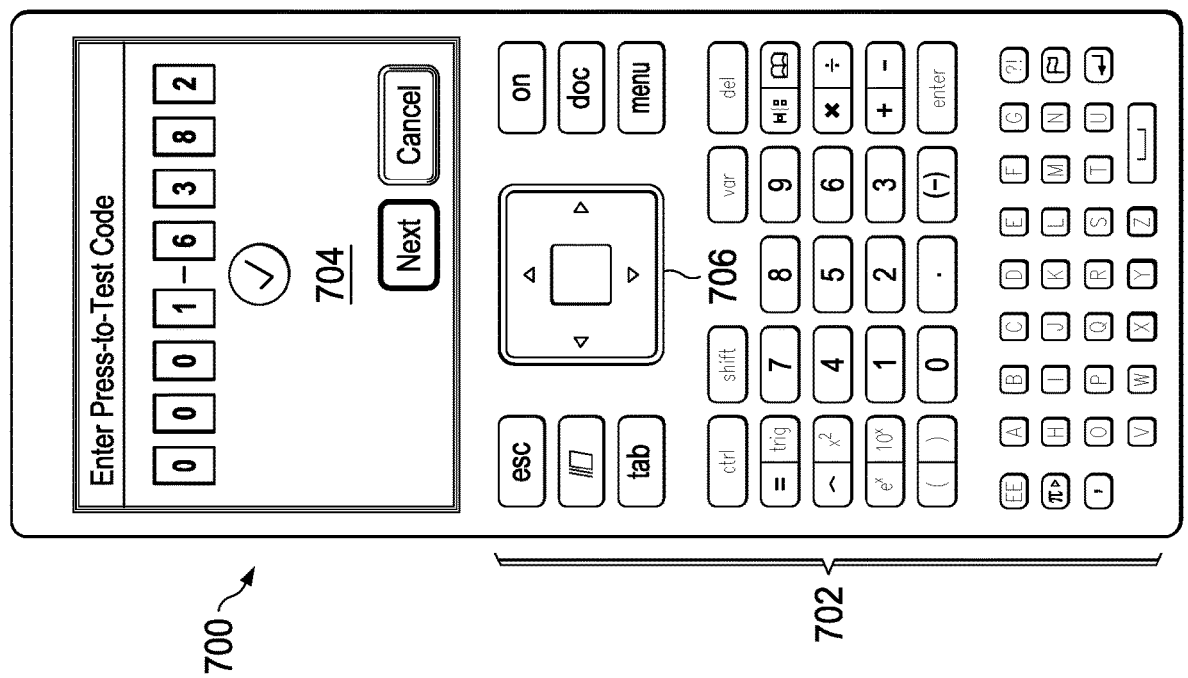

Embodiments described herein can be implemented on any suitably configured handheld device, e.g., a handheld graphing calculator. FIG. 7 is an example of a handheld graphing calculator 700, i.e., TI-Nspire™ CX II graphing calculator, configured to support test codes in accordance with embodiments described herein. The handheld calculator 700 includes a display screen 704, and a keypad 702 that includes a touchpad 706. The display screen 704 can be used to display, among other things, information input to applications executing on the handheld graphing calculator 700 and various outputs of the applications. For example, the display screen 704 may be used to display dialog boxes as described herein. The display screen 704 may be, for example, an LCD display.

The keypad 702 allows a user to enter data and commands and to start and interact with applications executing on the handheld graphing calculator 700. The keypad 702 also includes an alphabetic keyboard for entering text. The touchpad 706 allows a user to interact with the display 704 by translating the motion and position of the user's fingers on the touchpad 706 to provide functionality similar to using an external pointing device, e.g., a mouse. A user may use the touchpad 706 to perform operations similar to using a pointing device on a computer system, e.g., scrolling the display 704 content, pointer positioning, selecting, highlighting, etc.

The handheld graphing calculator 700 includes a processor 701 coupled to a memory unit 712, e.g., a non-transitory computer-readable medium, which may include one or both of memory for program storage and persistent data, e.g., read-only memory (ROM) or flash memory, and memory for non-persistent data and program storage, e.g., random-access memory (RAM). In some embodiments, the program storage memory stores software programs and the memory for non-persistent data stores intermediate data and operating results. An input/output port 708 provides connectivity to external devices, e.g., a wireless adaptor or wireless cradle. In one or more embodiments, the input/output port 708 is a bi-directional connection such as a mini-A USB port. Also included in the handheld graphing calculator 700 is an I/O interface 710. The I/O interface 710 provides an interface to couple input devices such as the touchpad 706 and the keypad 702 to the processor 701. In some embodiments, the handheld calculator 700 may also include an integrated wireless interface (not shown) or a port for connecting an external wireless interface (not shown).

In one or more embodiments, the memory unit 712 stores software instructions to be executed by the processor 701 to perform embodiments as described herein. Further, in some such embodiments, the memory unit 712 stores software instructions of an operating system and other functionality that support such embodiments on the handheld graphing calculator 700. One example of such software is that available on the TI-Nspire™ family of graphing calculators available from Texas Instruments Incorporated.

Figure 8:
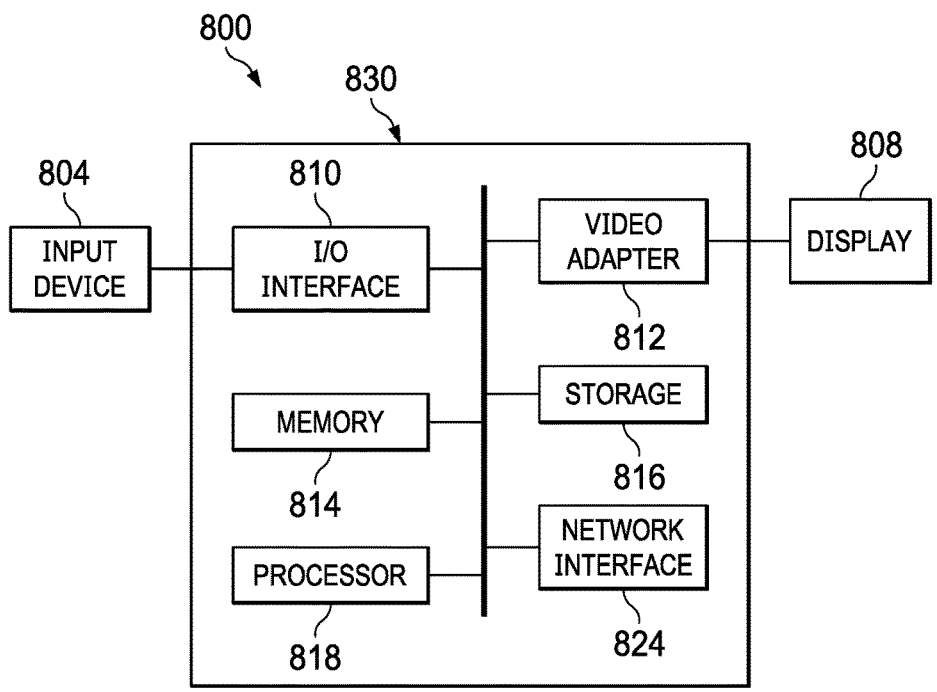
FIG. 8 is an example of a digital device 700 configured to support test codes.

Embodiments described herein can be implemented on any suitably configured digital device providing math software. FIG. 8 is an example of a digital device 800 configured to support test codes in accordance with embodiments described herein. The digital device 800 includes a processing unit 830 coupled to one or more input devices 804 (e.g., a mouse, a keyboard, or the like), and one or more output devices, such as a display screen 808. In some embodiments, the display screen 808 may be touch screen, thus allowing the display screen 808 to also function as an input device. The processing unit 830 may be, for example, a desktop computer, a workstation, a laptop computer, a tablet, a dedicated unit customized for a particular application, or the like. The display screen 808 may be any suitable visual display unit such as, for example, a computer monitor, an LED, LCD, or plasma display, a television, a high definition television, or a combination thereof. The display screen 808 can be used, for example, to display information input to applications executing on the processing unit 830 and various outputs of the applications. For example, the display screen 808 may be used to display dialog boxes as described herein.

The processing unit 830 includes a processor 818, memory 814, a storage device 816, a video adapter 812, and an I/O interface 810 connected by a bus. The bus may be one or more of any type of several bus architectures including a memory bus or memory controller, a peripheral bus, video bus, or the like. The processor 818 may be any type of electronic data processor. For example, the processor 818 may be a processor from Intel Corp., a processor from Advanced Micro Devices, Inc., a Reduced Instruction Set Computer (RISC), an Application-Specific Integrated Circuit (ASIC), or the like. The memory 814, e.g., a non-transitory computer-readable medium, can be any type of system memory such as static random access memory (SRAM), dynamic random access memory (DRAM), synchronous DRAM (SDRAM), read-only memory (ROM), a combination thereof, or the like. Further, the memory 814 can include ROM for use at boot-up, and DRAM for data storage for use while executing programs.

The storage device 816, e.g., a non-transitory computer-readable medium, can include any type of storage device configured to store data, programs, and other information and to make the data, programs, and other information accessible via the bus. In one or more embodiments, the storage device 816 stores software instructions to be executed by the processor 818 to perform embodiments described herein. In some such embodiments, the memory unit 814 stores software instructions of teacher or student software that emulates a handheld device that may include functionality supporting embodiments as described herein. Examples of such teacher and student software are the TI-Nspire™ CX Premium Teacher Software and the TI-Nspire™ CX Student Software, both available from Texas Instruments Incorporated.

The video adapter 812 and the I/O interface 810 provide interfaces to couple external input and output devices to the processing unit 830. The processing unit 830 also includes a network interface 824. The network interface 824 allows the processing unit 830 to communicate with remote units via a network (not shown). The network interface 824 may provide an interface for a wired link, such as an Ethernet cable or the like, or a wireless link. The digital device 800 may also include other components not specifically shown. For example, the digital device 800 may include power supplies, cables, a motherboard, a USB interface, removable storage media, cases, and the like.

OTHER EMBODIMENTS

While the disclosure has been described with respect to a limited number of embodiments, those skilled in the art, having benefit of this disclosure, will appreciate that other embodiments can be devised which do not depart from the scope disclosed herein.

For example, embodiments have been described herein in which a test code is generated on a math assistance device. In other embodiments, a separate software application may be provided to generate test codes. In other embodiments, test codes may be provided in a paper or electronic document.

In another example, embodiments are described herein in which functionality restrictions are selected via check boxes. In other embodiments, other ways for designation of functionality restrictions may be used, such as, for example, a drop down menu or a Y/N slider.

In another example, embodiments are described herein in which a test code is displayed or manually entered as a decimal number. In other embodiments, a test code may be displayed or manually entered as a hexadecimal number or any other suitable display/entry format.

In another example, embodiments are described herein with example functionality that can be restricted and example test settings. In other embodiments, there may be more or fewer or differing functionality and/or test settings. In other embodiments, there may be no test settings.

In another example, embodiments of generating a test code are described herein using a binary digit representation of the functionality and test setting values. In other embodiments, different techniques may be used.

Software instructions implementing all or portions of embodiments described herein may be initially stored in a non-transitory computer-readable medium and loaded and executed by one or more processors. In some cases, the software instructions may be distributed via removable non-transitory computer-readable media, via a transmission path from non-transitory computer-readable media on another digital system, etc. Examples of non-transitory computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the disclosure.

What is claimed is:

1. A method for test configuration on a first math assistance device, the method comprising:
    receiving a test code by the first math assistance device, wherein the test code comprises one or more functionality restrictions; and
    entering secure test mode on the first math assistance device with the one or more functionality restrictions.

2. The method of claim 1, wherein the test code further comprises one or more test settings and entering secure test mode further comprises entering the secure test mode with the one or more test settings.

3. The method of claim 1, wherein the first math assistance device is a handheld graphing calculator.

4. The method of claim 1, wherein the first math assistance device is a digital device comprising math software.

5. The method of claim 1, wherein receiving a test code further comprises manual entry of the test code by a user of the first math assistance device.

6. The method of claim 5, wherein receiving a test code further comprises determining whether the test code is valid or invalid.

7. The method of claim 6, wherein receiving a test code further comprises displaying a message indicating an upgrade may be needed when the test code is invalid.

8. The method of claim 1, wherein receiving a test code further comprises user selection of functionality restrictions on the first math assistance device, wherein the test code is generated responsive to the user selection.

9. The method of claim 1, wherein entering secure test mode further comprises displaying a summary of the one or more functionality restrictions comprised by the test code.

10. The method of claim 1, wherein the test code is generated on a second math assistance device, wherein a user of the second math assistance device selects the one or more functionality restrictions.

11. The method of claim 1, wherein receiving a test code further comprises receiving the test code from a second math assistance device communicatively coupled to the first math assistance device.

12. A math assistance device comprising:
    a non-transitory computer-readable medium storing software instructions to:
        receive a test code by the math assistance device, wherein the test code comprises one or more functionality restrictions; and
        enter secure test mode on the math assistance device with the one or more functionality restrictions; and at least one processor coupled to the non-transitory computer-readable medium to execute the software instructions.

13. The math assistance device of claim 12, wherein the test code further comprises one or more test settings and entering secure test mode further comprises entering the secure test mode with the one or more test settings.

14. The math assistance device of claim 12, wherein the math assistance device is a handheld graphing calculator.

15. The math assistance device of claim 12, wherein the math assistance device is a digital device comprising math software.

16. The math assistance device of claim 12, wherein the software instructions to receive a test code further comprise software instructions for manual entry of the test code by a user of the math assistance device.

17. The math assistance device of claim 16 wherein the software instructions to receive a test code further comprise software instructions to determine whether the test code is valid or invalid.

18. The math assistance device of claim 17, wherein the software instructions to receive a test code further comprise software instructions to display a message indicating an upgrade may be needed when the test code is invalid.

19. The math assistance device of claim 12, wherein the software instructions to receive a test code further comprise software instructions for user selection of functionality restrictions on the math assistance device, wherein the test code is generated responsive to the user selection.

20. The math assistance device of claim 12, wherein the software instructions to enter secure test mode further comprise software instructions to display a summary of the one or more functionality restrictions comprised by the test code.

21. The math assistance device of claim 12, wherein the test code is generated on a second math assistance device, wherein a user of the second math assistance device selects the one or more functionality restrictions.

22. The math assistance device of claim 12, wherein the software instructions to receive a test code further comprise software instructions to receive the test code from a second math assistance device communicatively coupled to the math assistance device.

23. A method for generating a test code, the method comprising:
displaying a test configuration interface on a math assistance device, wherein the test configuration interface comprises a plurality of functionality restrictions;
receiving user selection of one or more functionality restrictions in the plurality of functionality restrictions; and
generating a test code corresponding to the one or more functionality restrictions.

24. The method of claim 23, further comprising saving the test code in association with a user specified name.

25. The method of claim 23, wherein the math assistance device is a handheld graphing calculator.

26. The method of claim 23, wherein the math assistance device is a digital device comprising math software.

27. The method of claim 23, wherein the test configuration interface further comprises at least one test setting and wherein receiving user selection further comprises receiving user selection of the at least one test setting and generating a test code further comprises generating a test code corresponding to the one or more functionality restrictions and the at least one test setting.

* * * * *